US005713547A

United States Patent [19]

Yu

[11] Patent Number: 5,713,547

[45] Date of Patent: Feb. 3, 1998

[54] GUITAR STAND

[76] Inventor: Ming-Ti Yu, 122-5, Jun Liao Road, Feng Yuan, Taichung Shien, Taiwan

[21] Appl. No.: 661,864

[22] Filed: Jun. 11, 1996

[51] Int. Cl.$^{6}$ .......... F16M 11/38

[52] U.S. Cl. .......... 248/166; 84/327; 403/87; 403/119

[58] Field of Search .......... 248/176.1, 164, 248/166, 167, 165, 173, 178, 434, 168, 188.6, 371, 163.1, 431; 403/87, 84, 119; 84/453, 327, 387 A, 329, 280

[56] References Cited

U.S. PATENT DOCUMENTS

| | | | |
|---|---|---|---|
| 1,138,417 | 5/1915 | Rottenburg | 248/166 |
| 2,939,360 | 6/1960 | Carten | 248/431 |
| 4,150,733 | 4/1979 | Plummer | 248/168 |
| 4,738,392 | 4/1988 | Farmer | 248/188.6 |
| 4,993,635 | 2/1991 | Dupre | 248/166 |
| 5,082,222 | 1/1992 | Hsu | 248/188.6 |
| 5,197,701 | 3/1993 | Olson | 248/166 |
| 5,350,143 | 9/1994 | Hoshino | 248/166 |
| 5,375,497 | 12/1994 | Pirchio et al. | 84/327 |
| 5,383,634 | 1/1995 | Liao | 248/176.1 |
| 5,505,413 | 4/1996 | Hennessey | 84/327 |
| 5,551,178 | 9/1996 | Foley et al. | 248/431 |

FOREIGN PATENT DOCUMENTS

| | | | |
|---|---|---|---|
| 49407 | 10/1934 | Denmark | 248/166 |

*Primary Examiner*—Ramon O. Ramirez
*Assistant Examiner*—Gwendolyn W. Baxter

[57] ABSTRACT

A guitar stand comprises a main hollow rod, a first hollow leg, a second hollow leg, a first brace, a second brace, a first bracket, and a second bracket. A pivot means fastens the first hollow leg and the second hollow leg on the main hollow rod pivotally. The first brace connects the first bracket on the first hollow leg. The second brace connects the second bracket on the second hollow leg. A hollow upper block is disposed on top of the main hollow rod.

1 Claim, 3 Drawing Sheets

GUITAR STAND

BACKGROUND OF THE INVENTION

The invention relates to a guitar stand. More particularly, the invention relates to a guitar stand which can be easily folded.

Referring to FIG. 6, a conventional guitar stand has a lower rod 3 and three legs 1*a*, 1*b* and 1*c* connected by a four-way joint 2. An upper rod 6*a* is inserted in the lower rod 3. An upper U-shaped fork 6*b* extends from an upper end of the upper rod 6*a*. A transverse pipe 4 connects the lower rod 3. A lower U-shaped fork 5 is inserted in the transverse pipe 4. Since the upper rod 6*a* is inserted in the lower rod 3 only, the two rods 3 and 6*a* are not fastened tightly. The upper rod 6*a* may fall down after a long period of usage. Since the lower U-shaped fork 5 is inserted in the transverse pipe 4 only, the lower U-shaped fork 5 can be pulled out easily. The lower U-shaped fork 5 may be lost after it is disassembled to be transported from one place to another place. Furthermore, the transverse pipe 4 is too high so that the center of gravity of the guitar and the guitar stand is too high also. Thus the guitar stand can be easily fallen down while the guitar stand is bumped.

SUMMARY OF THE INVENTION

An object of the invention is to provide a guitar stand which is easily folded.

Another object of the invention is to provide a guitar stand which can lower the center of gravity of the guitar while the guitar is rested on the guitar stand.

Another object of the invention is to provide a plurality of foldable elements of a guitar stand which can be folded but cannot be detached.

Accordingly, a guitar stand comprises a main hollow rod, a first hollow leg, a second hollow leg, a first brace, a second brace, a first bracket, and a second bracket. A pivot means fastens the first hollow leg and the second hollow leg on the main hollow rod pivotally. The first brace connects the first bracket on the first hollow leg. The second brace connects the second bracket on the second hollow leg. A hollow upper block is disposed on top of the main hollow rod. The main hollow rod has a lobe disposed on an upper portion of the main hollow rod. A circular hole and a curved hole are formed on the main hollow rod. A hollow upper block has a lower protrusion inserted in an upper end of the main hollow rod. A first and second round cushions are disposed adjacent to a first and second sides of the hollow upper block, respectively. The first round cushion has a first center hole. The second round cushion has a second center hole. A first bolt passes through the first center hole to fasten the first round cushion on the hollow upper block. A second bolt passes through the second center hole to fasten the second round cushion on the hollow upper block. A longitudinal plate is disposed on a top of the transverse plate. The longitudinal plate has an upper hole to match the corresponding circular hole and a lower hole to match the corresponding curved hole. A first fastening member passes through the circular hole and the upper hole and a second fastening member passes through the lower hole and the curved hole to fasten the lobe and the longitudinal plate together. A first and second joints are disposed on the first and second hollow legs, respectively. Each of the first and second joints has a threaded lower portion inserted in a top interior of the corresponding hollow leg, an annular flange abutting the threaded lower portion, and a top recess to receive the transverse plate. A bevel is disposed beneath the top recess. A notch is formed on a top rim of the first hollow leg. A third and fourth fastening members fasten the first and second joints on the transverse plate. The first brace is fastened on the first hollow leg. The second brace is fastened on the second hollow leg. A first hook extends from a top end of the first bracket to be inserted in the first brace. A second hook extends from a top end of the second bracket to be inserted in the second brace. The first and second brackets are folded upward. The first and second hollow legs are moved close together and moved toward the main hollow rod.

DETAILED DESCRIPTION OF THE INVENTION

Figure 1:
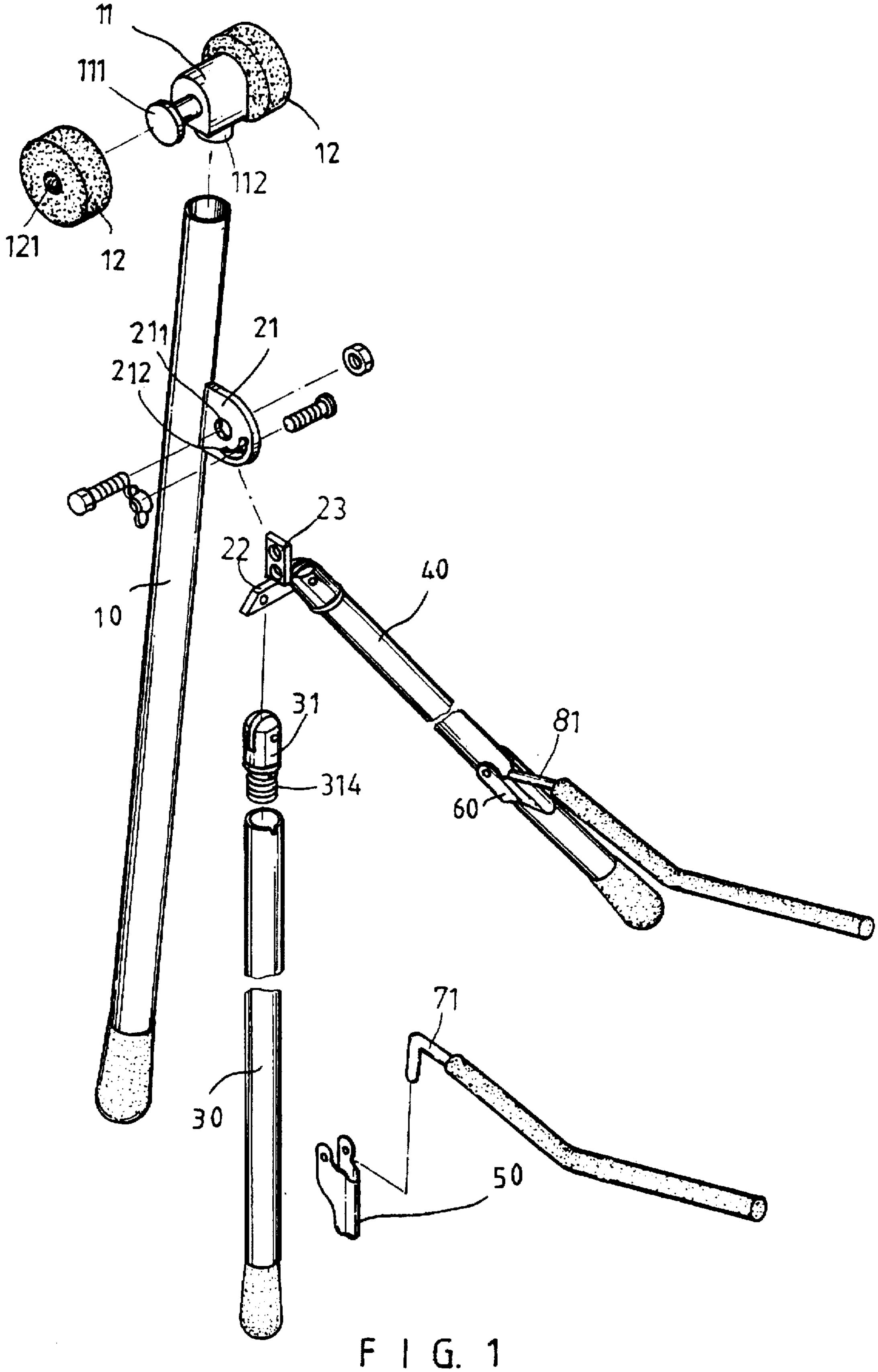
FIG. 1 is a perspective exploded view of a guitar stand of a preferred embodiment in accordance with the invention.
Figure 2:
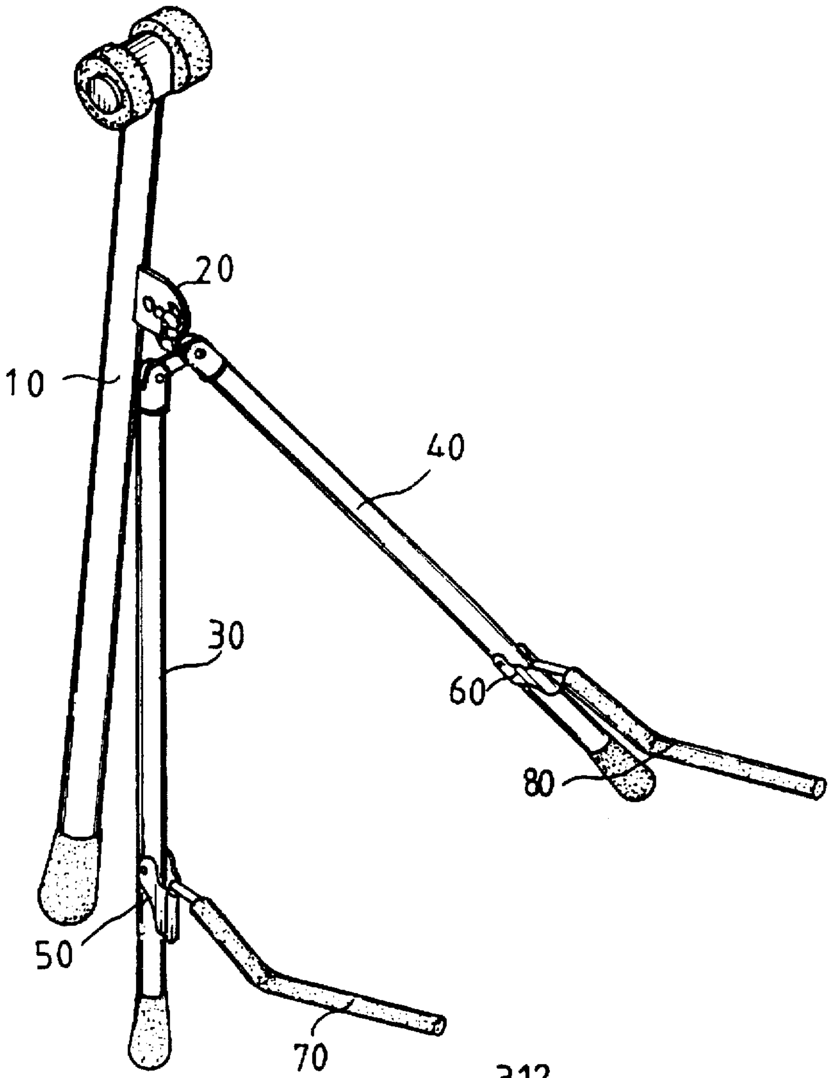
FIG. 2 is a perspective assembly view of FIG. 1.
Figure 3:
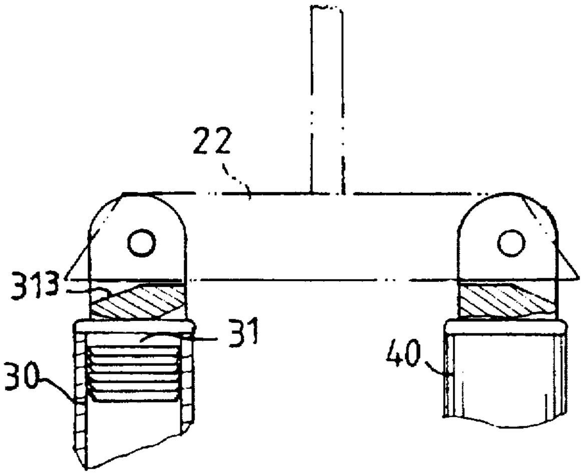
FIG. 3 is a schematic view illustrating a transverse plate coupling with the first and second joints.
Figure 4:
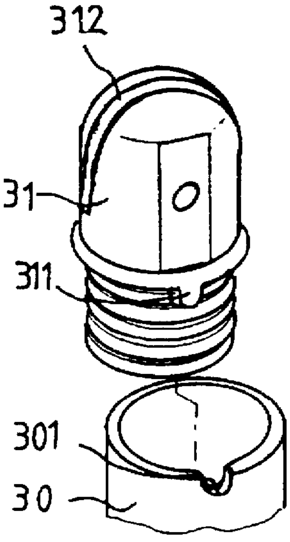
FIG. 4 is a partially perspective exploded view of the first joint and the first hollow legs.

Referring to FIGS. 1 to 4, a guitar stand comprises a main hollow rod 10, a first hollow leg 30, a second hollow leg 40, a first brace 50, a second brace 60, a first bracket 70, and a second bracket 80. A pivot means 20 fastens the first hollow leg 30 and the second hollow leg 40 on the main hollow rod 10 pivotally. A hollow upper block 11 is disposed on top of the main hollow rod 10. The pivot means 20 has a lobe 21, a transverse plate 22 and a longitudinal plate 23 which is disposed on top of the transverse plate 22. A main hollow rod 10 has a lobe 21 disposed on an upper portion of the main hollow rod 10. A circular hole 211 and a curved hole 212 are formed on the main hollow rod 10. A hollow upper block 11 has a lower protrusion 112 inserted in an upper end of the main hollow rod 10. A first and second round cushions 12 are disposed adjacent to a first and second sides of the hollow upper block 11, respectively. The first round cushion 12 has a first center hole 121. The second round cushion 12 has a second center hole 121. A first bolt 111 passes through the first center hole 121 to fasten the first round cushion 12 on the hollow upper block 11. A second bolt 111 (not seen) passes through the second center hole 121 to fasten the second round cushion 12 on the hollow upper block 11. A longitudinal plate 23 is disposed on a top of the transverse plate 22. The longitudinal plate 23 has an upper hole to match the corresponding circular hole 211 and a lower hole to match the corresponding curved hole 212. A first fastening member passes through the circular hole 211 and the upper hole and a second fastening member passes through the lower hole and the curved hole 212 to fasten the lobe 21 and the longitudinal plate 23 together. A first and second joints 31 are disposed on the first and second hollow legs 40, respectively. Each of the first and second joints 31 has a threaded lower portion 314 inserted in a top interior of the corresponding hollow leg 30 or 40, an annular flange 311 abutting the threaded lower portion 314, and a top recess 312 to receive the transverse plate 22. A bevel 313 is disposed beneath the top recess 312. A notch 301 is formed on a top rim of the first hollow leg 30. A third and fourth fastening members fasten the first and second joints 31 on the transverse plate 22. The first brace 50 is fastened on a lower portion of the first hollow leg 30. The second brace 60 is fastened on a lower portion of the second hollow leg 40. A first hook 71 extends from a top end of the first bracket 70 to be inserted in the first brace 50. A second hook 81 extends from a top end of the second bracket 80 to be inserted in the second brace 60.

Figure 5:
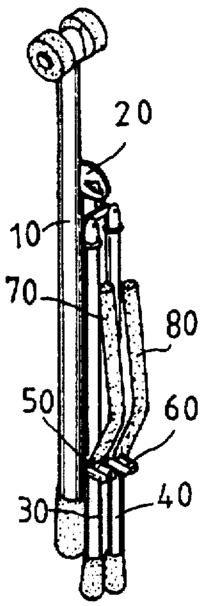
FIG. 5 is a schematic view illustrating a collapse of a guitar stand.
Figure 6:
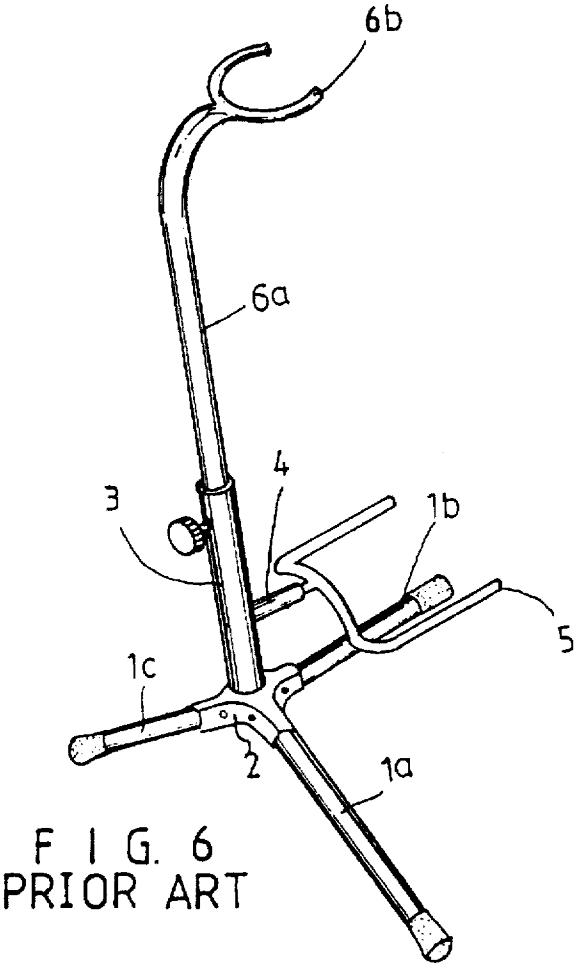
F I G. 6 PRIOR ART
FIG. 6 is a perspective assembly view of a guitar stand of the prior art.

Referring to FIG. 5, the first and second brackets 80 are folded upward. The first and second hollow legs 30 and 40 are moved close together and moved toward the main hollow rod 10. Thus the guitar stand is easily folded.

Furthermore, the center of gravity of the guitar is lowered while the guitar is rested on the guitar stand.

The invention is not limited to the above embodiment but various modification thereof may be made. Further, various changes in form and detail may be made without departing from the scope of the invention.

I claim:

1. A guitar stand comprising:

a main hollow rod having a lobe disposed on an upper portion of said main hollow rod, a circular hole and a curved hole formed on said main hollow rod, a hollow upper block having a lower protrusion inserted in an upper end of said main hollow rod, a first and second round cushions disposed adjacent to a first and second sides of said hollow upper block, respectively, said first round cushion having a first center hole, said second round cushion having a second center hole, a first bolt passing through said first center hole to fasten said first round cushion on said hollow upper block, a second bolt passing through said second center hole to fasten said second round cushion on said hollow upper block, a longitudinal plate disposed on a top of a transverse plate, said longitudinal plate having an upper hole to match said circular hole and a lower hole to match said curved hole, a first fastening member passing through said circular hole and said upper hole and a second fastening member passing through said lower hole and said curved hole to fasten said lobe and said longitudinal plate together, a first and second joints disposed on said first and second hollow legs, respectively, each of said first and second joints having a threaded lower portion inserted in a top interior of said corresponding hollow leg, an annular flange abutting said threaded lower portion, and a top recess to receive said transverse plate, and a bevel disposed beneath said top recess, a third and fourth fastening members fastening said first and second joints on said transverse plate, a first brace fastened on a lower portion of said first hollow leg, a second brace fastened on a lower portion of said second hollow leg, a first hook extending from a top end of said first bracket to be inserted in said first brace, a second hook extending from a top end of said second bracket to be inserted in said second brace, wherein said first and second brackets are folded upward, and said first and second hollow legs are moved close together and moved toward said main hollow rod.

* * * * *